3,600,191
METHOD OF SOLUBILIZING FUMARIC ACID
Aubrey P. Stewart, Jr., and Gene J. Freemyer, Corning, Iowa, assignors to Allied Chemical Corporation, New York, N.Y.
Filed Mar. 19, 1968, Ser. No. 714,229
Int. Cl. A23l 1/00
U.S. Cl. 99—78            7 Claims

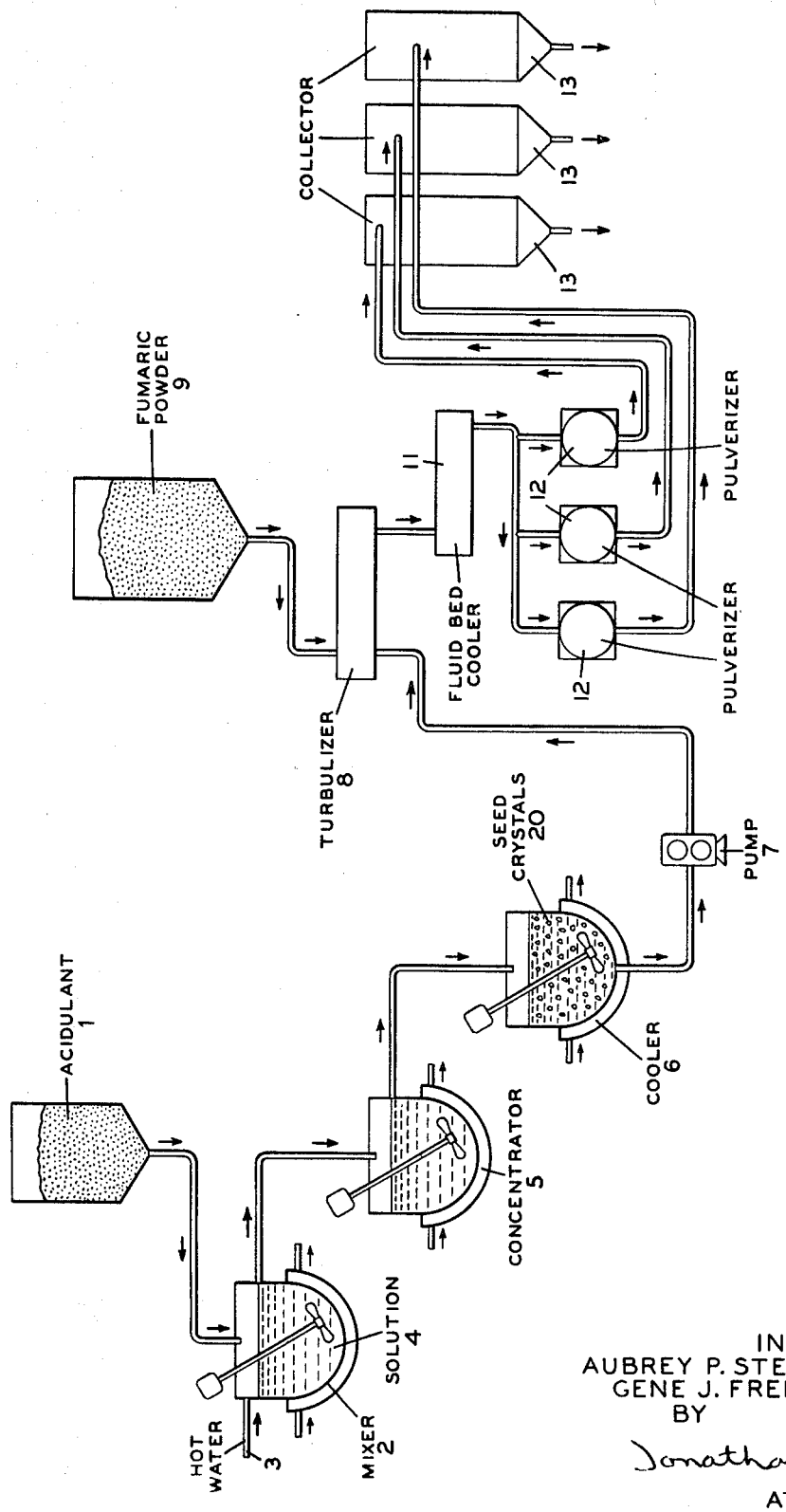

ABSTRACT OF THE DISCLOSURE

Fumaric acid powder is pelletized with a crystallizing syrup of a water-soluble food acidulant. Following completion of crystallization the pellets are pulverized to a diameter of 10 to 80 microns.

BACKGROUND OF THE INVENTION

This invention relates to a process for solubilizing fumaric acid and to the solubilized compositions obtained therefrom; in particular, it relates to pelletized fumaric acid of reduced particle size.

Food acidulants have many applications and uses as food additives. Such acidulants, or food acids, provide a degree of tartness to foods, often providing a pleasing flavor, are used to lower the pH which is frequently helpful in the preservation of foods, and are a source of nutritive value. The major food acids are malic, fumaric, citric, adipic, succinic and tartaric. These acids all have the general properties of food acidulants but are each substantially different from the other in their solubility and taste characteristics.

From among these acids fumaric is the least soluble in water and tartaric is most soluble. Malic and citric acids are relatively soluble in water, while adipic and succinic are of medium solubility, between malic and fumaric acids. Fumaric acid is the most economical of the solid food acids, both from the standpoint of cost and quantity required for a given acidity. Its use, however, is somewhat limited by its low solubility in water as mentioned, but it does have a low rate of moisture absorption which is a desirable feature in terms of flowability and resistance to caking. All of the above mentioned food acids, when finely ground, have a tendency to lump when mixed with water. Fumaric acid is particularly difficult to mix with cold water when in the form of a finely ground powder. However, it is desirable from the standpoint of solubility rate that the powder be finely ground to present the greatest surface area to the water solution.

Stewart, U.S. Pat. 3,248,226, Apr. 26, 1966, discloses a method of forming pellets of fumaric acid with crystallizable binders, such as sucrose, dextrose, aluminum potassium sulfate and the like, so that the resulting product can be added to cold water without lumping whereupon it disperses quite readily. Pelletizing fumaric acid according to the procedure of U.S. Pat. 3,248,226, whereby fumaric acid powder is added to a crystallizing syrup of a binder to form the pellets, substantially increases its solubility rate; however, considerable time is still required to dissolve it completely in cold water.

It is an object of this invention to prepare fumaric acid compositions which undergo complete dissolution in cold water at a rate substantially greater than that afforded by compositions available heretofore. It is a further object of this invention to provide pelletized compositions of fumaric acid wherein the binder, itself, is a food acidulant. These and other objects of the invention will become more apparent in the following disclosure.

SUMMARY OF THE INVENTION

The process of the instant invention comprises pelletizing fumaric acid with a crystallizable, water-soluble food acidulant, in a ratio between about 80:20 to 30:70 by weight and then reducing the size of the pellets so obtained to a diameter between about 10 and 80 microns. The compositions obtained by this process undergo rapid dissolution in cold water. Among the food acidulants which may be used according to the instant invention are those mentioned hereinbefore, viz, malic, citric, adipic, succinic and tartaric.

REFERENCE TO THE DRAWING

For a better understanding of the instant invention, reference is made to the accompanying drawing which shows schematically the process of the instant invention.

DETAILED DESCRIPTION OF THE INVENTION

The instant invention, as compared to aforesaid U.S. Pat. 3,248,226 and other prior art, provides an improved solubilizing process for food acids, in particular for combinations of the more water-soluble types mentioned above with fumaric acid. The preferred water-soluble acid for the purposes of this invention is malic acid, and its combination with fumaric acid in the manner to be described hereinafter results in compositions having desirable features not found in either acid separately. Of course, the other water-soluble acids mentioned, for example citric acid, may be substituted for malic acid. The procedure for pelletizing used in the instant process is generally that described in aforesaid patent, with a crystallizable, water-soluble food acidulant, especially malic acid, used as the binder. However, it has been found that a more satisfactory combination product of fumaric and malic acids can be prepared by departing in some respects from the methods described therein. In particular, it has been unexpectedly found that reducing the particle size of the pellets obtained by the process of aforesaid patent provides surprising advantages with respect to the solubility rate of the pellets. The pellets obtained by the prior art method have a particle size in excess of 20 mesh, and it has now been found that by reducing the particle size, the pellets undergo dissolution in cold water at a substantially greater rate than heretofore possible, as illustrated in the procedure of Example I.

With reference to the drawing powdery malic acid 1, for example of 120 mesh size is fed to a steam kettle mixer 2 where it is combined with incoming hot water 3 to form solution 4. Concentrate is fed through the desired series of kettles, one being shown 5, to a cooler 6, in which the malic solution is cooled to a point at which crystallization commences, at about 160–170° F. The syrup is seeded 20 in the cooler to initiate crystallization. Initiation of crystallization may be accomplished by seeding with malic acid or by other known methods. The crystallizing malic syrup is then pumped, as at 7, to a turbulizer 8 for combination with fumaric acid powder 9 having a mesh size between about 1.5 and 50 microns. In said turbulizer 8, pellets of a diameter between about 400 and 850 microns 20–40 mesh are formed, as described in aforesaid patent.

The pelletized fumaric acid is then cooled and dried in a fluid bed cooler 11, and redried to less than about 6% moisture content, and preferably 3% or lower moisture content so as to facilitate grinding. The pellets are then ground in pulverizers 12 to reduce the particle size to between about 10 and 80 microns, and preferably to about 30 microns in diameter. The pellets of reduced size are then collected at 13.

The pelletized fumaric acid of reduced particle size so obtained provides food acidulant compositions with a combination of advantages not available heretofore. It is economical to use and is very readily soluble in cold water, and the use of a food acidulant as the binder reduces the quantity of pelletized material required to achieve a given acidity. Furthermore, the compositions so obtained remain flowable and do not pick up moisture for a substantial period of time, for example in excess of a 30-day period at 80% relative humidity.

The pellets immediately obtained by the pelletizing process of aforesaid Stewart patent U.S. 3,248,226 are not suitable for reduction of pellet size. It is necessary that the binder crystallize to a substantial extent, thereby increasing the firmness of the pellets, before they can be ground or pulverized to obtain the desired particle size. Crystallization of the binder of the pellets can be accomplished by a variety of means, for example by allowing the pellets to stand for a period of time, for example up to about one day or longer. However crystallization is preferably accomplished by cooling the pellets; reducing the temperature of the pellets to about 90–100° F. is suitable for this purpose. In addition, reducing the moisture content of the pellets to less than about 6%, and preferably to about 3% or less, will accomplish this same purpose. In a preferred embodiment of this process the pellets will be both cooled and dried prior to reduction of pellet size.

Although the above process has been described in relation to the use of malic acid as the binder it is understood that the other water-soluble acids mentioned hereinbefore, such as citric acid, could be substituted therefor. However, the use of malic acid is preferred since it affords substantially firmer pellets than may be obtained otherwise which are less hygroscopic and easier to grind.

EXAMPLE I

A 50% solution of malic acid in water was concentrated by boiling to a syrup containing about 74% malic acid. The syrup was then cooled to about 162° F., at which point it was seeded with a very small amount of finely ground malic acid. This crystallizing malic acid syrup was then pumped to a turbulizer which, in this case, is known commercially as a Strong Scott Turbulizer, and sprayed into the turbulizer through a spray nozzle. Simultaneously, finely ground fumaric acid (average particle diameter of 13 microns) was fed into the turbulizer at such a rate that the combination was 60% fumaric acid and 40% malic acid. The turbulizer formed pellets of approximately 20–40 mesh (400 microns–850 microns diameter) which were then passed over a fluid bed cooler, and dried to 3% moisture content.

This pelletized material mixed readily with water without lumping, but was not instantly soluble. When added to water in the amount of about 0.5%, it required up to about 5 minutes to completely dissolve at the temperature of 40° F. However, upon grinding the 400–850 micron diameter pellets in a mill to an average diameter of 30 microns, the resulting product dissolved in 40° F. water without lumping, again at the 0.5% level, within 30 seconds.

Fumaric acid and malic acid, both of 120 mesh, were dry blended together in a ratio of 60:40 by weight and ground, without pelletizing according to the teaching of this disclosure, to about a 30 micron average diameter particle size. This product lumped and floated badly on the surface of the water, dissolved with great difficulty and required a considerable agitation over a period of 5 to 10 minutes of time.

EXAMPLE II

A 50% solution of citric acid in water was concentrated by boiling to a syrup containing about 75% citric acid. The syrup was then cooled to about 160° F., and crystallization then induced by adding a small amount of finely ground citric acid. The crystallizing syrup was used to pelletize fumaric acid in the manner of Example I, with a ratio of fumaric:citric about 60:40. The cooled, dried pellets were then ground to an average diameter of 30 microns to afford the final desired product which dissolved very quickly and without lumping in 40° F. water.

The apparatus and process of the foregoing disclosure are provided to illustrate the instant invention. It is intended that the scope of the invention be limited only by the following claims.

What is claimed is:

1. A process for solubilizing fumaric acid which comprises:
   pelletizing fumaric acid powder of mesh size between about 1.5 to 50 microns with a crystallizing syrup of a water-soluble food acidulant with fumaric acid:soluble acidulant ratio between about 80:20 and 30:70 by weight;
   completing the crystallizing of the soluble acidulant in the resulting pellets; and then
   pulverizing to reduce the size of the pellets to a diameter between about 10 and 80 microns.

2. A process as in claim 1 wherein the acidulant is malic acid.

3. A process as in claim 1 wherein the acidulant is citric acid.

4. A process as in claim 1 wherein the acidulant in the pellets is crystallized by cooling the pellets.

5. A process as in claim 1 wherein the acidulant in the pellets is crystallized by drying the pellets to less than about 6% moisture content.

6. A process for solubilizing fumaric acid which comprises:
   pelletizing fumaric acid powder of mesh size between about 1.5 and 50 microns by agitating the fumaric acid with a crystallizing syrup of malic acid, with a fumaric acid:malic acid ratio between about 80:20 and 30:70 by weight;
   cooling the resulting pellets; and
   drying the pellets to less than about 6% moisture content; and then
   pulverizing to reduce the size of the pellets to a diameter between about 10 and 80 microns.

7. A process for solubilizing fumaric acid which comprises:
   pelletizing fumaric acid powder of mesh size about 13 microns by agitating the fumaric acid with a crystallizing syrup of malic acid, with a fumaric acid:malic acid ratio of about 60:40 by weight;
   cooling the resulting pellets to about 100° F.; and
   drying the pellets to less than about 3% moisture content; and then
   pulverizing to reduce the size of the pellets to a diameter of about 30 microns.

References Cited

UNITED STATES PATENTS

| | | | |
|---|---|---|---|
| 3,248,226 | 4/1966 | Stewart | 99—78X |
| 3,370,956 | 2/1968 | Reitman et al. | 99—78 |

OTHER REFERENCES

| | | |
|---|---|---|
| 1,043,979 | 7/1965 | Great Britain. |

NORRIS O. WOLK, Primary Examiner

S. B. DAVIS, Assistant Examiner

U.S. Cl. X.R.

252—363.5